ns Patent [19]

Krestel et al.

[11] 3,984,146
[45] Oct. 5, 1976

[54] APPARATUS FOR ACTUATING OPERATIONAL CHAIRS
[75] Inventors: Erich Krestel, Erlangen; Siegfried Herold, Bensheim, both of Germany
[73] Assignee: Siemens Aktiengesellschaft, Munich, Germany
[22] Filed: Feb. 10, 1972
[21] Appl. No.: 225,252

Related U.S. Application Data
[63] Continuation-in-part of Ser. No. 24,184, March 31, 1970, abandoned.

[52] U.S. Cl. ............................................. 297/330
[51] Int. Cl.² ...................... A47C 1/02; A47C 1/06; A47C 1/12
[58] Field of Search ............. 297/330, 83, 71, 314, 297/327; 248/371, 397, 398; 5/62; 318/648, 649

[56] References Cited
UNITED STATES PATENTS

| 2,572,910 | 10/1951 | Brown | 248/371 UX |
| 2,641,305 | 6/1953 | Oishei | 297/314 |
| 2,647,233 | 7/1953 | Kutzler | 318/648 X |
| 2,649,564 | 8/1953 | Meredith | 318/648 X |
| 2,672,917 | 3/1954 | Collura | 297/327 |
| 2,710,047 | 6/1955 | Duppstadt | 297/314 |
| 2,966,937 | 1/1961 | Rydberg | 297/314 X |
| 3,094,054 | 6/1963 | Moors et al. | 318/648 X |
| 3,172,699 | 3/1965 | Naughton | 297/327 |
| 3,230,351 | 1/1966 | Platt et al. | 318/648 X |
| 3,271,650 | 9/1966 | Riddle | 318/648 X |
| 3,286,143 | 11/1966 | Kurtz et al. | 648/648 X |
| 3,286,245 | 11/1966 | Cozart | 318/648 X |
| 3,315,934 | 4/1967 | Taylor | 297/314 X |
| 3,330,523 | 7/1967 | Nichols | 297/330 X |
| 3,514,153 | 5/1970 | Maurer et al. | |

Primary Examiner—Paul R. Gilliam
Attorney, Agent, or Firm—Richards & Geier

[57] ABSTRACT

An operational chair for dental work is automatically actuated, preferably with hydraulic adjusting devices, in relation to the seat height, inclination of the back of the chair and the swinging of the chair about a transverse axis and possibly also about a longitudinal axis. Adjusting members are used for holding initial positions and bringing about the desired positions for each of the adjusting devices. The invention is particularly characterized by the provision of a group of members providing the required values for each position which can be selected. These members can be connected by a position selector, for example, a selecting key, with actuating means for the adjusting devices, the actuating means being firmly coupled with members holding the initial positions.

13 Claims, 6 Drawing Figures

APPARATUS FOR ACTUATING OPERATIONAL CHAIRS

This application is a continuation-in-part of our co-pending U.S. patent application Ser. No. 24,184, filed Mar. 31, 1970, now abandoned.

This invention relates to an apparatus for automatically providing selected positions for dental operational chairs by means of hydraulic adjusting devices for the height of the seat, the inclination of the back, and the swinging about a transverse axis and possibly about a longitudinal axis, whereby adjusting members are used for holding the initial position and bringing about the required position for each of the adjusting devices.

Dental operational chairs are adapted to the requirements of dental practice by having a very extensive possibility of movement of their individual parts to provide the greatest variety of the desired treatment positions for the patient. Corresponding adjusting devices are provided for that purpose, by means of which the height of the chair can be adjusted, as well as the location of its back, its swinging around the transverse axis and possibly also the swinging about the longitudinal axis. The last-mentioned adjustment has the purpose of inclining the patient toward the doctor who is handling him.

Actually all types of drives can be used for operating the adjusting devices, including electromotors, but mostly hydraulic systems are used which operate with a built-in high pressure pump, valve actuating devices and stroke cylinders. The valves are predominantly magnetic valves and are operated by electrical actuating circuits. End switches which are used to protect the adjusting devices against excessive stroke etc., operate upon valve circuits and possibly also upon the switching circuit for the high pressure pump. Means operated by hand or foot are used to provide the desired position and location of the patient; they are operative so long as the adjusting members are actuated or so long as the end switches are active. It has been suggested already, that the operational chair should be made adjustable to any desired position. It is known to use for that purpose adjusting chains or the like, which switch off the adjusting devices by end switches when a certain position has been reached, for example, a predetermined height or position of the chair back.

The following four positions generally cover the position of the patient and consequently the setting of the operational chair:

I. When the doctor is sitting and the patient is lying, the chair must be raised, the back inclined and the chair swung about the transverse axis. A swinging about the longitudinal axis toward the treating doctor can be set, depending as to whether the doctor uses mostly his right hand or his left hand.

II. When the doctor stands and the patient sits, the chair must be raised and easily swung about the transverse axis; furthermore, the back must be adjusted and eventually the entire chair must be swung again about the longitudinal axis.

III. When the doctor sits and the patient sits the chair must be lowered. The inclining and the swinging can be mostly eliminated in this case. A sidewise swinging about the longitudinal axis is to be avoided, for example, when making impressions.

IV. This position is provided as the so-called "getting out" position in which the patient can be conveniently seated on the chair. In this position the arm supports can be raised, any present foot support can be moved away from patient's reach, etc.

An object of the present invention is to provide a device by the use of which at least the above-mentioned positions can be automatically selected and set by one or more position keys or the like, whereby all setting steps should take place automatically so that no corrections or only minor corrections would be necessary to attain the best possible treating position.

Other objects of the present invention will become apparent in the course of the following specification.

In the accomplishment of the objectives of the present invention it was found desirable to provide a group of members providing the required values for each position which can be selected. These members can be connected by a position selector, such as a selecting key, with the actuating means of the adjusting devices, the actuating means being firmly coupled with members holding the initial positions.

It is advantageous to make adjustable the members providing the required values for the individual positions, so that a preliminary adjustment can be made to correspond to the size of the doctor and the required stretching of arms to make vessels and devices available to the users. This preliminary adjustment will then remain for all subsequent selected positions. It is advisable to employ for each of the provided positions a group of members providing the required values, which can be combined into structural groups, whereby an individual structural group contains a number of members corresponding to the desired number of chair movements. Essentially said members can consist of a large variety of parts of the type used in remote control apparatus, including, for example, potentiometers, inductive members, capacitive members, members with field plates, etc. In the simplest case it is possible to operate with resistances which cooperate with corresponding members holding the initial positions and directly actuated by adjusting devices, whereby, for example, voltage dividing circuits are formed.

The switching of members providing the required values can take place through program selectors, which operate with cam switches or the like. These members can also be shaped as insertable units which can be pushed like program cards into a suitable contact device. The release of the program operation to attain the desired position can take place by a starting key or the like. If the individual members providing the required values are firmly fixed, then it is possible to provide its own starting key for each of the positions which can be selected and thus select the program for the desired position.

Additional switches can be provided for subsequent adjustment, for example, for fine corrections in the position of the patient after the desired position has been reached. These switches can actuate the adjusting devices directly. In this case also a large variety of known members can be used, from the simple multiple switch to the no-contact feeler. The construction of foot-or hand operated switches, as well as the arrangement of switches and starting keys within the range of the chair back, can follow the desires and requirements of actual practice.

The invention will appear more clearly from the following detailed description when taken in connection with the accompanying drawings showing by way of example only, a preferred embodiment of the inventive idea.

Figure 1:
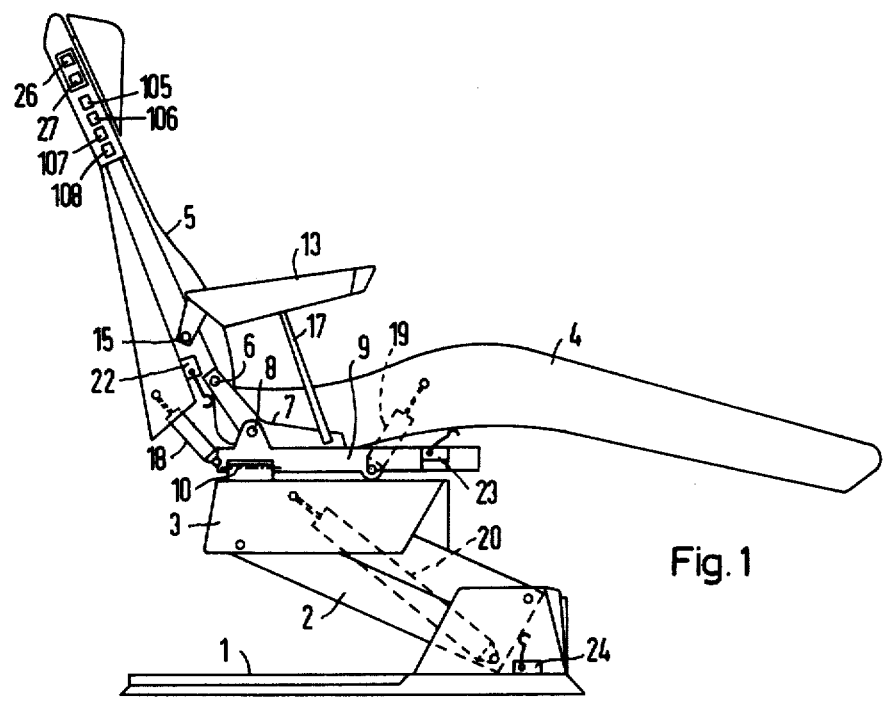
FIG. 1 is a side view of a dental patient's chair of the present invention.
Figure 2:
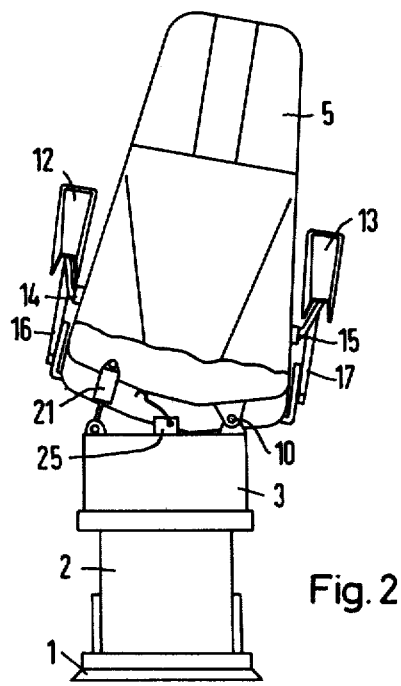
FIG. 2 is a rear view of the chair of FIG. 1 in a sidewise tipped position.

FIG. 1 shows a dental patient's chair having a back plate 1 and a parallelogram carrier 2 mounted thereon and supporting a carrier 3. The upper part of the chair consisting of a seat 4 and a back 5 is mounted upon the carrier 3. The seat 4 includes a foot rest. The back 5 can be inclined relatively to the seat 4 by axles 6 carried by frame members 7 on both sides of the chair. The seat 4 can be swung relatively to the carrier 3 about a horizontal axle 8. The axle 8 is mounted upon an intermediate plate 9 which lies upon the carrier 3 and which can be swung sidewise about an axle 10 extending parallel to the longitudinal axis of the chair. FIG. 2 shows the chair in such a sidewise tipped position.

Arm supports 12 and 13 are located on opposite sides of the chair; they are connected on the one end with the back 5 by axle bearings 14 and 15 and on the other end with the seat 4 by articulated rods 16 and 17.

The parts of the chair are moved by hydraulically actuated devices 18, 19, 20 and 21 consisting of cylinders and pistons.

Actual-value transmitters 22, 23, 24 and 25 are used to determine changes in the position of the chair. Actual-value tramsmitter 22 serves for the inclination of the back, transmitter 23 serves for the tipping position of the seat 4 about the axle 8, transmitter 25 serves for the tipping position of the seat 4 about the axle 10 and transmitter 24 serves for indicating the height of the seat 4. There are also two switches 26 and 27 which can be used by the dentist to move the chair into two adjustable positions which can be selected at will.

These features are described in greater detail in connection with the description of FIG. 6.

Figure 3:
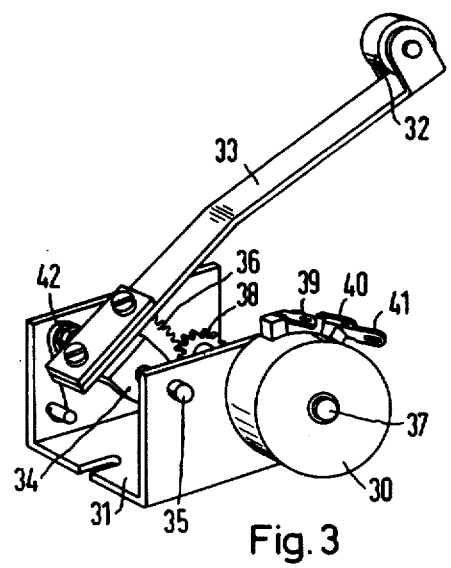
FIG. 3 is a perspective view of an actual-value transmitter.

FIG. 3 shows an actual value transmitter which is mounted in a suitable location upon the chair, as shown in FIG. 1. The transmitter consists substantially of a rotary potentiometer 30 which is supported upon a U-shaped sheet metal part 31 and which can be adjusted by a feeler lever 33 provided with a roller 32. The lever 33 is fixed upon a support 34 which is swingable about an axle 35. The support 34 carries a toothed disk segment 36 which meshes with a pinion 38 rotatable upon an axle 37 and mounted upon the axle of the rotary potentiometer 30. The potentiometer 30 has contact parts 39, 40 and 41. A coiled spring 42 presses the roller 32 of the lever 33 against its supporting surface, as shown in FIG. 4.

Figure 4:
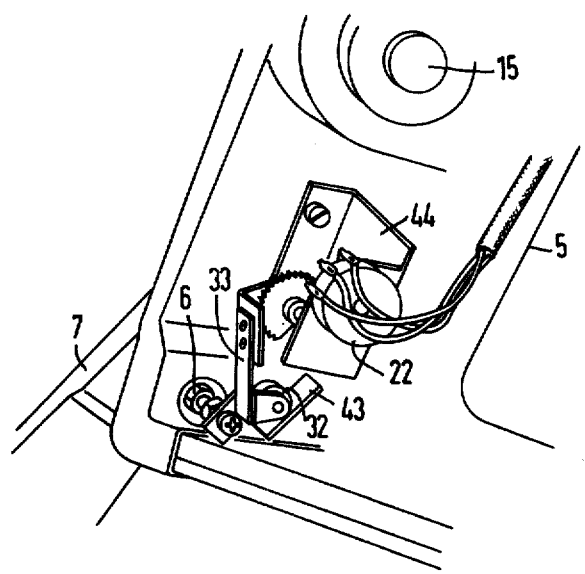
FIG. 4 is a partial section of the back of the chair showing its support and a mounted actual-value transmitter.

FIG. 4 shows the actual-value transmitter 22 in its built-in state to show the inclination of the back. As illustrated, the back 5 is connected with the frame portion 7 of the seat 4 by the bearing axle 6. A roller supporting member 43 is provided adjacent the axle 6 and is firmly angularly connected with the frame 7 of the seat 4. The roller 32 of the lever 33 bears against the member 43 constituting a roller path. The actual-value transmitter 22 is fixed by an angular member 44 to the back 5.

The actual-value transmitters 23, 24 and 25 are mounted in a similar manner at corresponding locations of the chair (FIG. 1).

Figure 5:
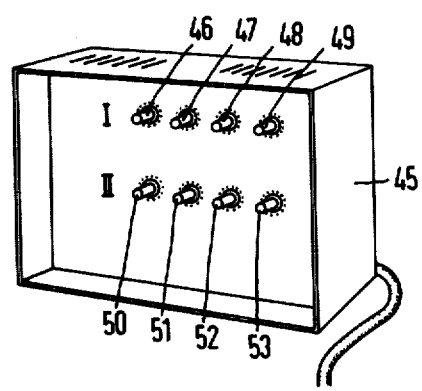
FIG. 5 is a perspective view of a switch box having switches for setting the desired values of different chair positions.

FIG. 5 shows a switch box 45 wherein the dentist can set the two above-mentioned selectable chair positions I and II. Two rows of rotary buttons 46 to 49 and 50 to 53 are located upon the servicing side of the switch box 45. These buttons are connected with the rotary potentiometers 54 to 57 and 58 to 61 (FIG. 6) constituting desired-value transmitters. Each row of the buttons pertains to a different chair position. Rotary buttons 50 and 46, 51 and 47, 52 and 48, as well as 53 and 49, located one above the other, pertain to one adjusting device. The two buttons 50 and 46 can be used to select the inclination of the back of the chair (corresponding actuating device 18), the buttons 51 and 47 are used for the tipping position of the seat about the axle 8, the buttons 52 and 48 are used to set the height of the seat and the buttons 53 and 49 are used for the tipping position of the seat about the longitudinal axle 10. The values of the resistances of the rotary potentiometers 54 to 57 and 58 to 61 correspond to those of the potentiometers of the actual-value transmitters 22 to 25. The switch box can be placed in any desired location in the treating-room or fixed in any suitable manner upon the patient's chair.

Figure 6:
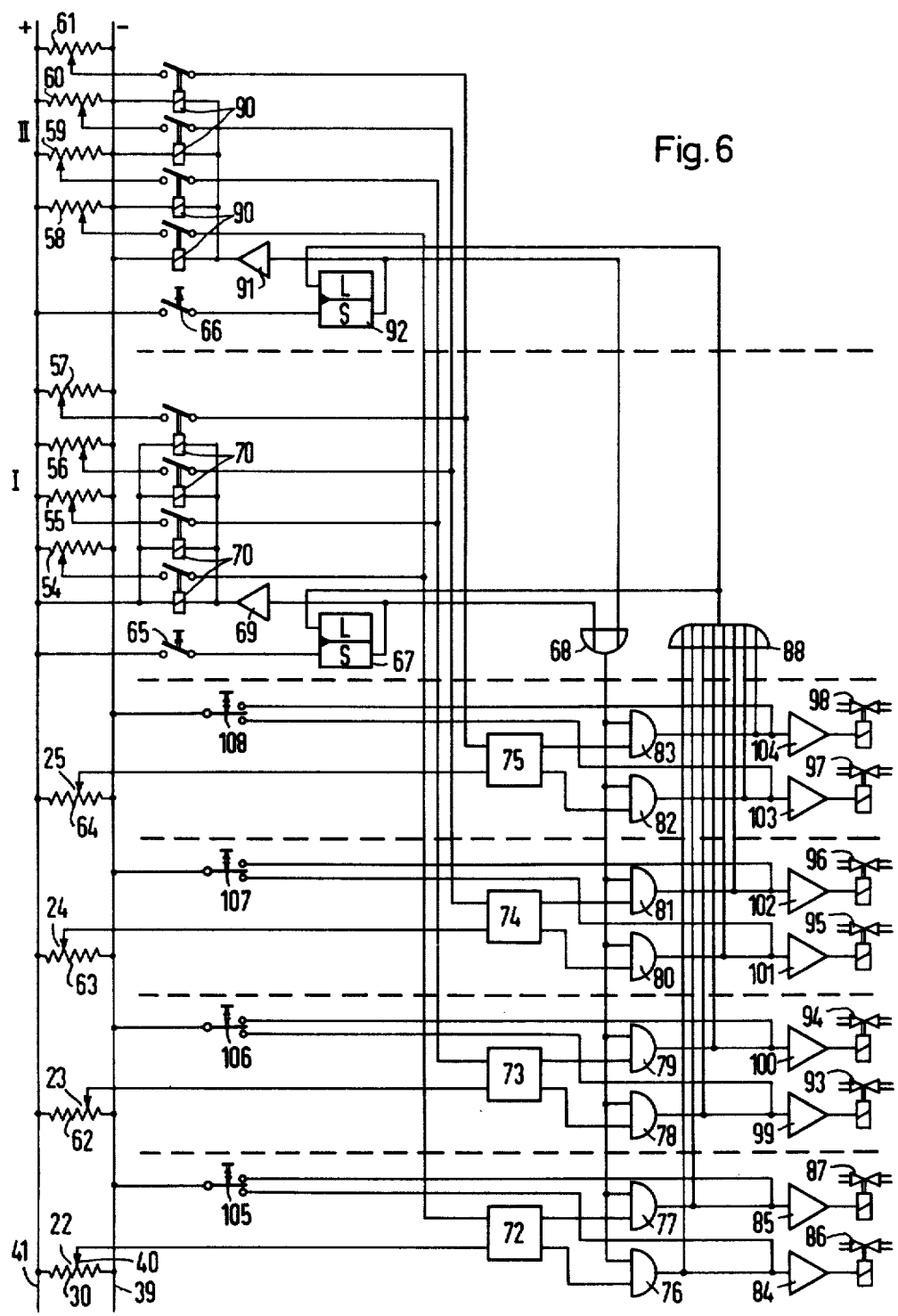
FIG. 6 is an electrical circuit diagram of means operating the chair.

FIG. 6 shows the electrical circuit diagram of the actuating device. The circuit is provided for two selectable and adjustable chair positions I and II. For each position there is a group of desired value transmitters, namely, transmitters 54 to 57 for position I and transmitters 58 to 61 for position II. Each group contains as many desired-value transmitters as there are actual-value transmitters. Potentiometers of actual-value transmitters 22 to 25 are indicated as 30, 62, 63 and 64. To set or provide a program for a chair position the rotary buttons which pertain to the chair position are set to the desired values. To facilitate this scales are provided adjacent each button upon the service area of the switch box 45. By turning the buttons the rotary potentiometers 54 to 57 or 58 to 61 which are connected with them, are set to a specific resistance value. If the dentist now actuates one of the switches 26 or 27 upon the back of the chair (FIG. 1), either the contact 65 or the contact 66 will be closed. If, for example, the contact 65 is closed (this being the selected chair position I), then a signal is produced at the inlet of the flip-flop stage 67. (In the drawing the letter S on the flip-flap stage means "to set", the letter L "to cancel"). At the outlet of this flip-flop stage 67 the signal is transmitted to the ODER device 68 as well as to the amplifier 69. The amplifier 69 causes the attraction of the relay 70 and the shifting of the potentials of the potentiometers 54 to 57 to the three point regulators 72 to 75. The three point regulators 72 to 75 are so constructed that depending upon the polarity of the differential voltage located at its inlets, the signal is located at one or the other outlet. If the inlet differential voltage at the tree point regulators is zero (this corresponds to a balanced condition between the actual-value transmitters and desired-value transmitters), then there is no signal at the two outlets of the regulator. The outgoing signals of the regulators 72 to 75 are transmitted to the corresponding UND devices 76 to 83.

If, for example, there is a different potential at the inlet of the three point regulator 72 (the actual value and desired value transmitters are not balanced), then the inlet of either the member 76 or of the member 77 receives a signal. At the same time through the member 68 which receives a signal from the flip-flop stage 67, a signal is transmitted to the other inlet of the UND members 76 and 77 and, naturally, to the corresponding inlets of the members 78 to 83. If there is a signal at the two inlets of either the UND member 76 or the member 77, then a signal is received by either the amplifier 84 or the amplifier 85. Then either the magnetic valve 86 of the moving device 18 (FIG. 1) is actuated for moving the chair back upwardly or the magnetic valve of the same device is actuated for moving the chair back downwardly.

By subsequent actuation of the moving device corresponding to the data of the desired value potentiometers the corresponding sliding contacts of the actual value transmitters (for example, contact 40 of potentiometer 30) are moved into a corresponding position. When the actual and desired values are balanced, the same potentials are located at the inlets of the three point regulators. This results in that no signal is transmitted any more at their outlets, so that the amplifiers 84 or 85 (or the amplifiers 99 to 104) do not receive any more signals. Since at the outlets of the UND stages 76 or 77 there are no signals, the ODER member 88 also receives no signal and extinguishes through the extinguishing stage S of the flip-flop 67 the outgoing signal (from "S" to "L"). The contacts of the relay 70 open.

The same applies to the other operating devices 19 to 21. For the second selectable chair position II there are the corresponding desired value transmitters 58 to 61, corresponding relays designated by the general numeral 90, the amplifier 91 and the flip-flop stage 92. Amplifiers designated as 99 to 104 are provided for the magnetic valves 93 to 98 and are used to magnify and transmit signals which were provided by the UND stages 78 to 83.

Each operating device 18 to 21 can be also operated by hand by actuating the feelers 105 to 108. Then the automatic actuation is not operable any more. The operating device remains actuated as long as the corresponding feeler is depressed.

The actuating device the circuit of which is shown in the drawings can be amplified to provide other adjustable chair positions (III, IV . . . etc.).

What is claimed is:

1. An apparatus for a dental patient's chair comprising a base, a seat, a support member connected with said seat and said base for carrying said seat, a back, at least one horizontal axle extending transversely to the longitudinal axis of the chair through said back, means supporting said axle upon said support member, a position-adjusting device connected with said back and said means for swinging said back, a horizontal axle extending through said seat and carried by said means, a second position-adjusting device connected with said seat and said means for swinging said seat, an actual value transmitter comprising a feeler lever, a sheet metal part swingably connected with said feeler lever, means connecting said feeler lever and said sheet metal part to said back and said seat, whereby the relative positions of said feeler lever and said sheet metal part constitute a measure for the position of said back, an electrical comparator circuit having a rotary potentiometer connected with the last-mentioned means, said potentiometer being coupled with said feeler lever and having a value variable with the shifting of said feeler lever corresponding to the swinging of the back, said circuit also having a second rotary potentiometer for balance determination which is adjustable to a value corresponding to the desired inclined position of said seat and a regulator having an inlet for connecting to said potentiometers and an outlet, means connecting said outlet with said means for swinging said back, said regulator having means delivering a signal when a balance has been reached for switching off said position-adjusting device and for actuating said position-adjusting device when there is no balance to provide relative movement of said back until the first potentiometer is moved into the balancing position, a third position-adjusting device connected with said back and said support member for adjusting the height of said seat, a transmitter connected with said base, and driving and switching means connected with said base for adjusting said seat relatively to said base.

2. An apparatus in accordance with claim 1, wherein said seat has a swivelling axis extending transversely to the longitudinal direction of the chair, a position adjusting device for tilting the seat with respect to the base about this axis, said apparatus having a further reference input transmitter to provide signals corresponding to a desired tilting position of the seat, and a further actual value transmitter having a movable tracer joined to the seat for taking off the actual tilting position of the seat, the last-mentioned actual value transmitter providing signals corresponding to said actual tilting position of the seat, another differential amplifier having two inputs, means electrically connecting one of them with said further actual value transmitter and means electrically connecting the other one with the further reference input transmitter, said other differential amplifier providing signals on its output, means operatively connecting said output with the last-mentioned position adjusting device to transmit said signals to this position adjusting device for actuating it for tilting the seat, said apparatus having further switching means connecting said further reference input transmitter with the input of the corresponding amplifier which is inoperative when it receives equal signals from the transmitters, the direction in which the last-mentioned position adjusting device is actuated being dependent upon the polarity of the signals received by its amplifier.

3. An apparatus in accordance with claim 1 wherein said seat has a further tilting axle extending along the direction of the longitudinal axis of the chair, a position adjusting device for tilting the seat about said axle, the apparatus having a further reference input transmitter to provide signals corresponding to a desired tilting position of the seat and having a further actual value transmitter including a movable tracer joined to the seat for taking off the actual tilting position of the seat, said actual value transmitter providing signals corresponding to the actual tilting position of the seat, a further differential amplifier having two inputs, means electrically connecting one of said inputs with said actual transmitter and means connecting the other one with said reference input transmitter, said further differential amplifier having an output, means operatively connecting said output with the last-mentioned position adjusting device to transmit signals from the amplifier to the position adjusting device for actuating it for tilting the seat about the above mentioned axis, said apparatus having further switching means connecting said reference input transmitter with the input of the corresponding amplifier, the amplifier being inoperative when it receives equal signals from the transmitters, the direction in which the position adjusting device is actuated being dependent upon the polarity of the signals received by its amplifier.

4. An apparatus in accordance with claim 3, wherein each position adjusting device comprises a plurality of uniform actual value transmitters arranged in sets, each set corresponding to a preselected and preset chair position and containing a separate actual value transmitter of a position adjusting device, each actual value transmitter containing a separate switch, means connecting said switches with inputs of corresponding differential amplifiers, each set having a position selecting switch, a flip-flop stage having an inlet connected with the last-mentioned switch and an outlet, and a switch device connected with said outlet, said position selecting switch when actuated changing the switch condition of the flip-flop stage and producing a signal transmitted to said switch device which actuates switches when the position selecting switch is actuated.

5. An apparatus in accordance with claim 4, wherein each position adjusting device comprises two actuating members, one of said members shifting the position adjusting device in one direction and the other member shifting the position adjusting device in another direction, a separate UND stage having an outlet connected with a separate actuating member, a first inlet connected with an outlet of the corresponding differential amplifier and a second inlet connected with the outlet of the flip-flop stage and receiving a signal therefrom when its switch condition is changed.

6. An apparatus in accordance with claim 5, having an ODER member, the outlet of said flip-flop stage being connected by said ODER member with the second inlet of the UND stage.

7. An apparatus in accordance with claim 6, when the switches connecting the reference input transmitters with the corresponding differential amplifiers are relay switch contacts, the relays being connected with the outlet of the corresponding flip-flop stage and receiving from it signals when the position selecting switch is actuated and the flip-flop stage is moved to a different switch condition.

8. An apparatus in accordance with claim 7, wherein each reference input transmitter has a separate relay having a switch contact connected with the reference value transmitter and also connected with the inlet of the corresponding differential amplifier.

9. An apparatus in accordance with claim 8, having at least four sets of reference input transmitters, whereby one set of reference input transmitters provides a position for the getting out of the patient.

10. An apparatus in accordance with claim 9, wherein the sets of the reference input transmitters are in the form of removable units, one for each set, which can be placed one at a time in connection with the controllers.

11. An apparatus in accordance with claim 10, in which the reference input transmitters are combined to form a unit remote from the chair.

12. An apparatus in accordance with claim 11, in which the reference input transmitters are individually adjustable as regards the magnitudes of the signals they supply.

13. An apparatus in accordance with claim 12, in which the position adjusting devices are hydraulically operated.

* * * * *